(12) United States Patent
Pavin et al.

(10) Patent No.: US 8,162,002 B2
(45) Date of Patent: Apr. 24, 2012

(54) DEVICE FOR CONTROLLING THE DELIVERY OF A COMBUSTIBLE GAS TO A BURNER APPARATUS

(75) Inventors: Federico Pavin, Torri di Quartesolo (IT); Michele Benvenuto, Mogliano Veneto (IT)

(73) Assignee: Sit La Precisa S.P.A., Padova (IT)

( * ) Notice: Subject to any disclaimer, the term of this patent is extended or adjusted under 35 U.S.C. 154(b) by 591 days.

(21) Appl. No.: 12/375,174

(22) PCT Filed: Jul. 28, 2006

(86) PCT No.: PCT/IT2006/000589
§ 371 (c)(1),
(2), (4) Date: Jan. 26, 2009

(87) PCT Pub. No.: WO2008/012849
PCT Pub. Date: Jan. 31, 2008

(65) Prior Publication Data
US 2010/0018585 A1    Jan. 28, 2010

(51) Int. Cl.
*F23D 14/72* (2006.01)
(52) U.S. Cl. .................. 137/613; 137/66; 137/489.5
(58) Field of Classification Search ............ 137/66, 137/65, 613, 489.5; 431/42, 43, 60, 12
See application file for complete search history.

(56) References Cited

U.S. PATENT DOCUMENTS

| | | | |
|---|---|---|---|
| 2,477,897 A | | 8/1949 | Ray |
| 3,557,831 A | * | 1/1971 | Katchka .......... 137/613 |
| 3,603,504 A | * | 9/1971 | Stang, Jr. et al. ........ 431/75 |
| 3,810,578 A | * | 5/1974 | Matthews ............ 236/80 R |
| 4,482,313 A | * | 11/1984 | Cheetham ............ 431/89 |
| 5,137,046 A | * | 8/1992 | Sollman et al. ........ 137/115.1 |
| 6,026,836 A | * | 2/2000 | Moenkhaus ............ 251/331 |
| 7,066,203 B2 | * | 6/2006 | Baarda ............ 137/613 |

(Continued)

FOREIGN PATENT DOCUMENTS

DE          1081395 B      5/1960
(Continued)

OTHER PUBLICATIONS

Communication from the Russian Examining Division citing the prior art; Russian Patent Appln. No. 2009107170, dated Oct. 28, 2010 with English Translation.

*Primary Examiner* — Kevin Lee
(74) *Attorney, Agent, or Firm* — Volpe and Koenig, P.C.

(57) ABSTRACT

A device for controlling the delivery of a combustible gas to a burner apparatus is provided including a main gas-delivery duct in which there is at least one servo-assisted diaphragm valve including a valve seat associated with a corresponding closure member with diaphragm control for opening the seat against the action of a resilient biasing member. The diaphragm valve includes a respective control solenoid valve with an electromagnetic operator for controlling the corresponding valve, the solenoid valve being arranged to bring about the opening/closure of a duct of a respective servo-assisted control circuit so as to operate the closure member of the valve indirectly, by the diaphragm control. The duct of the control circuit putting a portion of the main duct that is disposed upstream of the valve seat with respect to the direction of the gas-flow into flow communication with a respective control chamber of the diaphragm valve.

15 Claims, 3 Drawing Sheets

U.S. PATENT DOCUMENTS

2006/0207654 A1 9/2006 Huang

FOREIGN PATENT DOCUMENTS

| | | | |
|---|---|---|---|
| DE | 4038445 | A1 | 6/1992 |
| DE | 4339489 | A1 | 8/1994 |
| EP | 0159393 | B1 | 10/1985 |
| FR | 773323 | A1 | 11/1934 |
| GB | 1071395 | A | 6/1967 |
| SU | 1002735 | A1 | 3/1983 |
| SU | 1087746 | A1 | 4/1984 |
| WO | 9822753 | A1 | 5/1998 |
| WO | 2007060696 | A1 | 5/2007 |

* cited by examiner

DEVICE FOR CONTROLLING THE DELIVERY OF A COMBUSTIBLE GAS TO A BURNER APPARATUS

TECHNICAL FIELD

The present invention relates to a device for controlling the delivery of a combustible gas to a burner apparatus according to the characteristics set out in the preamble to main Claim 1.

BACKGROUND ART

The invention relates particularly but not exclusively to the field of devices for the multifunctional control of the delivery of combustible gases to burners of heating apparatus in general, in which the flame is intended for the direct heating of the environment or of an intermediate fluid circulating in a boiler system.

A typical known solution provides for a pair of servo-assisted valves that are arranged in series along the gas line, wherein the main safety valve (of the on-off type) is also a servo-valve with an electromagnetic operator for controlling its servo circuit. A device having the above-mentioned characteristics is known, for example, from the Applicant's International application PCT/IT2005/000686.

In this solution, in a condition of equilibrium of the pressure and resilient forces involved, the resilient force acting on the closure member of the main servo-valve is affected by the forces which are induced by the delivery pressure and which act in a direction such as to unload the biasing spring. In order to reduce pressure losses, this involves the use of biasing springs with resilient forces of low magnitude; however, in the event of obstruction of the travel of the closure member or accidental jamming thereof, these springs would not effectively be able to provide the resilient force necessary to close the closure member and would not guarantee the shutting-off of the passageway for the gas through the valve seat, thus compromising safety in the closure of the valve seat in malfunction conditions.

It would therefore be desirable to be able to use biasing springs which, in an equilibrium condition, can exert resilient forces much greater than those normally to be found in known devices.

DESCRIPTION OF THE INVENTION

The problem underlying the present invention is that of providing a device for controlling the delivery of a combustible gas to a burner apparatus which is designed structurally and functionally to overcome the limitations discussed with reference to the prior art mentioned.

This problem is solved by the invention by means of a device for controlling the delivery of a combustible gas to a burner apparatus formed in accordance with the appended claims.

BRIEF DESCRIPTION OF THE DRAWINGS

Further characteristics and advantages of the invention will become clearer from the following detailed description of some preferred embodiments thereof which are described by way of non-limiting example, with reference to the appended drawings, in which.

PREFERRED EMBODIMENTS OF THE INVENTION

Figure 1:
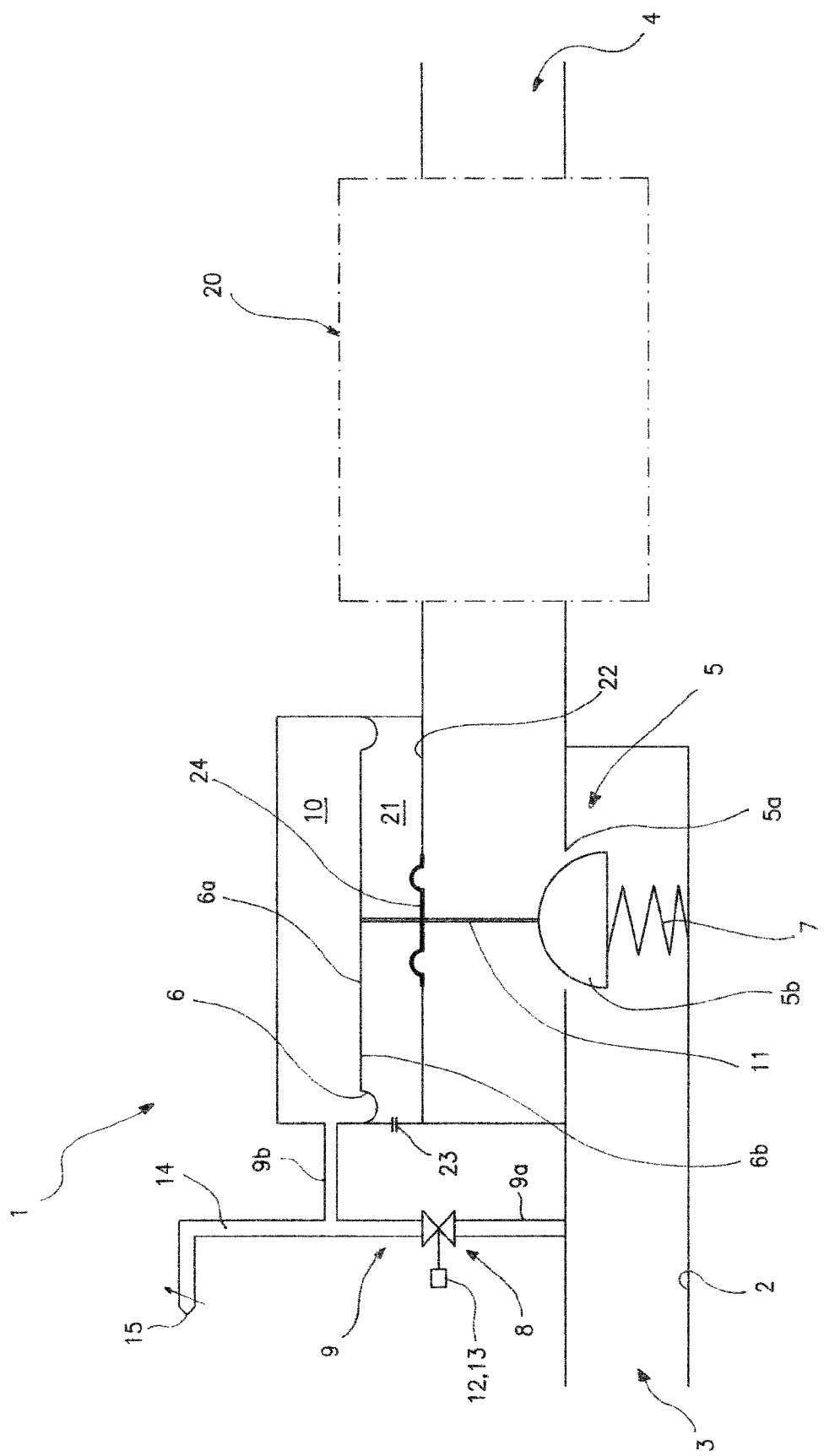
FIG. 1 is a longitudinal section through a device formed in accordance with the present invention.

With initial reference to FIG. 1, a device formed in accordance with the present invention for controlling the delivery of a combustible gas to a burner apparatus is generally indicated 1.

The device 1 comprises a main gas-delivery duct 2 extending between a gas input section 3 and a gas output section 4 where the gas is supplied towards a main burner, not shown in the drawing.

A servo-assisted diaphragm valve, generally indicated 5 and disposed in the main duct 2, comprises a valve seat 5a associated with a corresponding closure member 5b with diaphragm control 6 for opening the seat 5a against the action of a resilient biasing means such as a spring 7.

The diaphragm valve 5 performs the function of a main on-off valve for the safety closure of the main gas line and is associated with a control solenoid valve of the servo-control circuit which control solenoid valve is indicated 8 and is arranged for opening/closing a control duct 9 of the servo circuit which constitutes the duct for tapping off the pressure signal for transfer to a control chamber 10 of the servo-assisted circuit, as will be explained in detail in the following description. The diaphragm 6 acts directly on a control rod 11 of the closure member 5b which in turn is urged into closure of the seat by the spring 7.

A first side 6a of the diaphragm 6 defines the control chamber 10 which is in communication with the main duct 2 upstream of the servo-valve 5 by means of the control duct 9. In greater detail, the duct 9 defines a first portion 9a which communicates with the input section and in which the solenoid valve 8 is disposed, and a second portion 9b which forms an extension of the first portion and is in communication with the chamber 10. In the region of the solenoid valve 8, the respective portion of the duct 9 is opened or closed selectively by means of an electromagnet 12 of the on-off type with resilient biasing which acts on a closure element 13 that is associated with the passageway through the duct 9 and is movable away from and towards a position in which the passageway is shut off.

The duct 9 performs the function of a duct for tapping off the pressure signal for transfer to the control chamber 10 of the servo-assisted circuit.

An auxiliary pilot duct, indicated 14, branches off the duct 9 in a portion thereof that is downstream of the solenoid valve 8; the auxiliary duct is arranged for the supply of a pilot burner with a choking nozzle 15.

A member, generally indicated 20, for regulating the pressure of the gas delivered, is disposed in the main duct 2 downstream of the valve 5 and is shown only schematically in FIG. 1. This member may comprise, for example, a pressure modulator with a motor-driven actuator, or may comprise a second servo-valve arranged in series with the valve 5 and operatively connected to a diaphragm pressure regulator, this second constructional solution being shown in FIG. 2 and described in greater detail below.

With further reference to the valve 5, a second side of the diaphragm, indicated 6b and opposite to the side 6a, defines a space 21 which is separated from the portion of the duct 2 that extends downstream of the valve seat 5a so that the second side 6b of the diaphragm is not subjected to the delivery pressure of the gas that is present in the portion of the duct 2 downstream of the valve seat 5a.

In greater detail, the space 21 defines a chamber that is delimited jointly by the side 6b and by a facing wall 22, the chamber being open to the exterior through a hole 23 so that the second side 6b of the diaphragm is subjected to atmospheric pressure.

The control rod 11 of the closure member extends through the wall 22 and has an end 11a fixed firmly to the closure member 5b and a second, opposite end 11b which can contact the diaphragm 6 for the operative movement of the closure member away from and towards the valve seat.

A second, flexible diaphragm 24 is preferably mounted in the wall 22 and fixed firmly to the rod 11; by virtue of its flexibility, the diaphragm 24 permits axial movement of the rod during the operative travel for the opening/closure of the valve seat.

The second diaphragm 24 and the closure member 5b advantageously have respective mutually facing sides which have surface extensions that are substantially equivalent to one another so as to render the resultant of the stresses generated in the device by the delivery pressure acting on the above-mentioned sides of the closure member and of the second diaphragm generally such as to have no effect or even to be zero.

By virtue of the provision of the chamber 21 interposed between the duct 2 and the control chamber 10, the gas delivery pressure does not act on the side 6b of the diaphragm 6 which, on the contrary is subjected to atmospheric pressure. As a result, in equilibrium conditions, the resilient force of the spring 7 is not affected by the delivery pressure (tending to unload the spring) and, moreover, is substantially equal to the force induced by the supply pressure acting on an area equivalent to the difference between the area of the diaphragm 6 and the area of the closure member 5b.

For given conditions, it is thus possible to use a biasing spring which exerts a resilient force that can be considerably greater (even five times) than the resilient forces of the springs used in known solutions. The opening/closure of the closure member can thus be controlled more reliably and safely, facilitating the urging of the valve seat into the closure position when the gas passageway is to be shut off.

Figure 2:
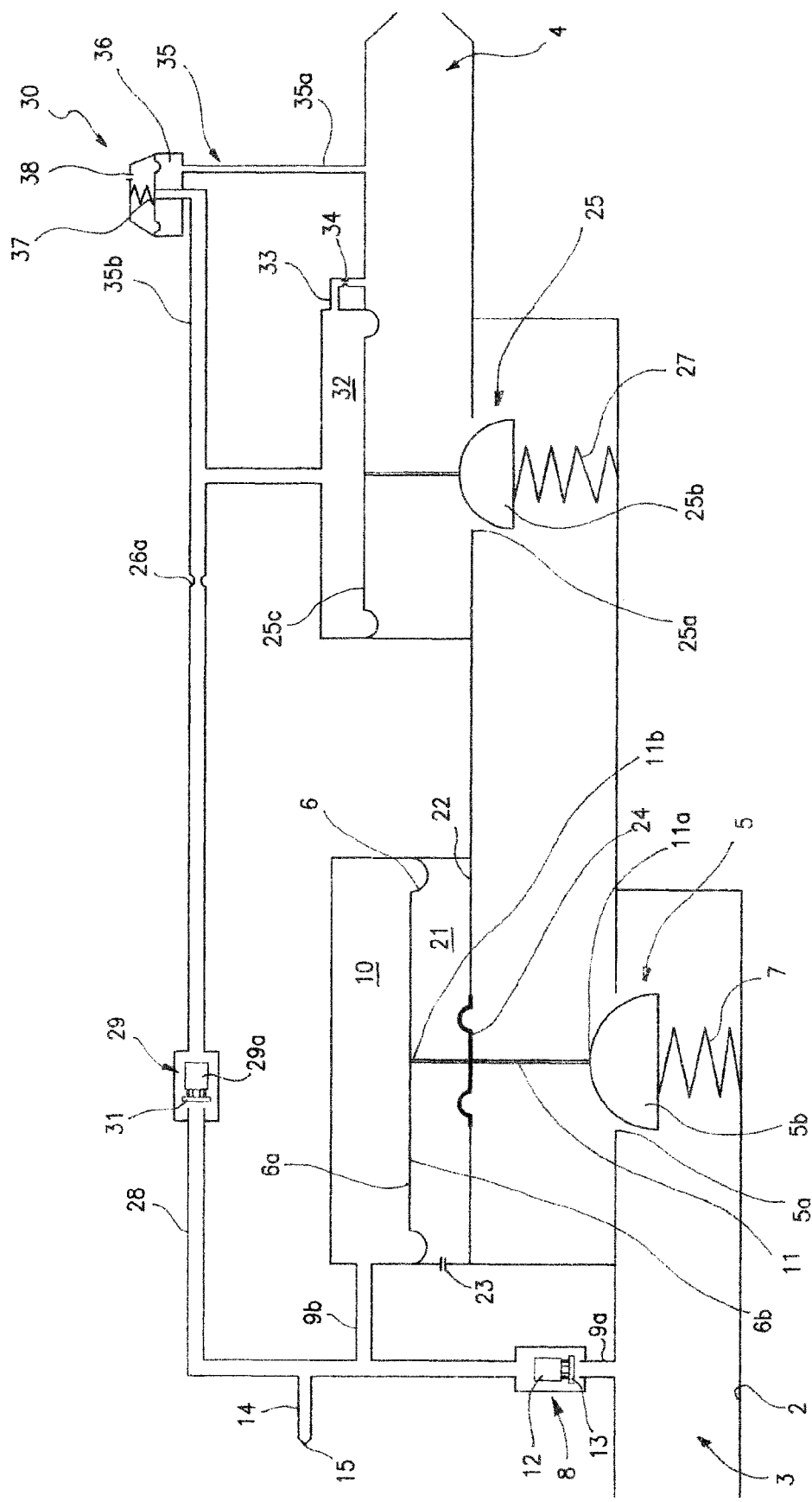
FIG. 2 is a longitudinal section through a multifunctional valve unit comprising the device according to the invention.

FIG. 2 shows schematically one of the possible applications of the device according to the invention in a valve unit for modulating gas delivery pressure in which details similar to those of the embodiment of FIG. 1 are indicated by the same reference numerals.

In this application, the diaphragm valve 5 having the function of the main on-off valve is combined with the regulator member 20 which comprises a second servo-valve 25 arranged in series with the first valve 5 and in turn including a diaphragm pressure regulator 30.

The diaphragm servo-valve 25 is disposed downstream of the valve 5 with respect to the direction of flow of the gas delivered through the duct 2 and comprises a respective servo-assisted circuit including a respective valve seat 25a associated with a corresponding closure member 25b with diaphragm control 25c for opening the seat 25a against the action of a resilient biasing means such as a spring 27.

The second portion 9b of the duct 9 is in communication with a control duct 28 in which there is a solenoid valve 29 arranged for the servo-assistance control of the servo-valve 25 as provided for the valve 5.

The second solenoid valve 29 is structurally and functionally equivalent to the solenoid valve 8.

In the region of the solenoid valve 29, the respective portion of duct 28 is opened or closed selectively by means of an electromagnet 29a of the on-off type with resilient biasing, acting on a closure element 31 associated with the passageway through the duct 28 and movable away from and towards a position in which it shuts off that passageway.

The duct 28, together with the portion of the duct 9 communicating therewith, performs the function of a duct for tapping off the pressure signal for transfer to a control chamber 32 of the respective servo-assisted circuit, the chamber 32 being defined on one side by the diaphragm 25c.

A constriction, indicated 26a, is provided in the duct 28 and, in particular, in the portion thereof which is disposed between the solenoid valve 29 and the control chamber 32.

In this embodiment, the pilot duct 14 branches from a portion of the duct 9 that is disposed between the solenoid valves 8 and 29 (upstream of 29 and downstream of 8).

The control chamber 32 is also connected to the output section 4 of the main duct 2, downstream of the valve seat 25a of the second servo-valve 25, by means of a respective discharge duct 33 in which a constriction 34 is advantageously provided.

The control duct 28 also branches, in a portion upstream of the control chamber 32, into a duct 35 which is connected to the discharge, that is, which is in communication with the output section 4 of the main duct 2, downstream of the valve seat 25a. The pressure regulator 30, which is shown schematically in FIG. 2, is advantageously provided in the duct 35. The pressure regulator is a conventional diaphragm pressure regulator, in which one side of the diaphragm defines a control chamber 36 communicating with the output section 4 of the duct 2 by means of a portion 35a of the duct 35, and can also shut off the output section of the other portion 35b of the duct 35 which communicates with the chamber 32. The opposite side of the diaphragm is acted on by a calibration spring 37 disposed in a chamber which is open to the atmosphere through a hole 38. The pressure regulator 30 is designed to react to and compensate for variations in delivery pressure and to bring the pressure back to a calibration value preset by adjustment of the spring 37.

In operation, with the electromagnets 12, 29a de-energized, the tapping ducts 9, 28 communicating with the control chamber are shut off (by the respective solenoid valves 8, 29) and the resilient biasing force of the springs 7, 27 ensures the closure of both valve seats 5a, 25a of the respective servo-valves. Upon a demand for the burner to be lit, first of all solely the electromagnet 12 is energized and, by opening the duct 9, allows gas to be supplied to the pilot burner and arranges for the opening of the diaphragm valve 5 under the control of the pressure collected in the control chamber 10 by means of the tapping duct 9 (in the portions 9a and 9b). During this pilot-burner lighting stage, the tapping duct 28 communicating with the control chamber 32 is still shut off by the solenoid valve 29 (with its electromagnet 29a de-energized) ensuring the closure of the valve seat 25a.

After the pilot burner has been correctly lit, the second electromagnet 29a is also energized and the tapping duct 28 is consequently opened for the flow of gas and a corresponding pressure, correlated with the input pressure, is produced in the control chamber 32. The diaphragm 25c, which is acted on by the force of the above-mentioned pressure thus tends to lift the respective closure member 25b from the corresponding seat 25a, allowing gas to flow through the main duct 2 towards the main burner. The delivery pressure is also regulated by the diaphragm pressure regulator 30.

It should be understood that the regulator member 20 described above represents only one of the possible embodiments of the pressure modulator that can be combined with the main valve 5, other types being equally applicable and sharing the same inventive concept relating to the main valve 5 described above.

Figure 3:
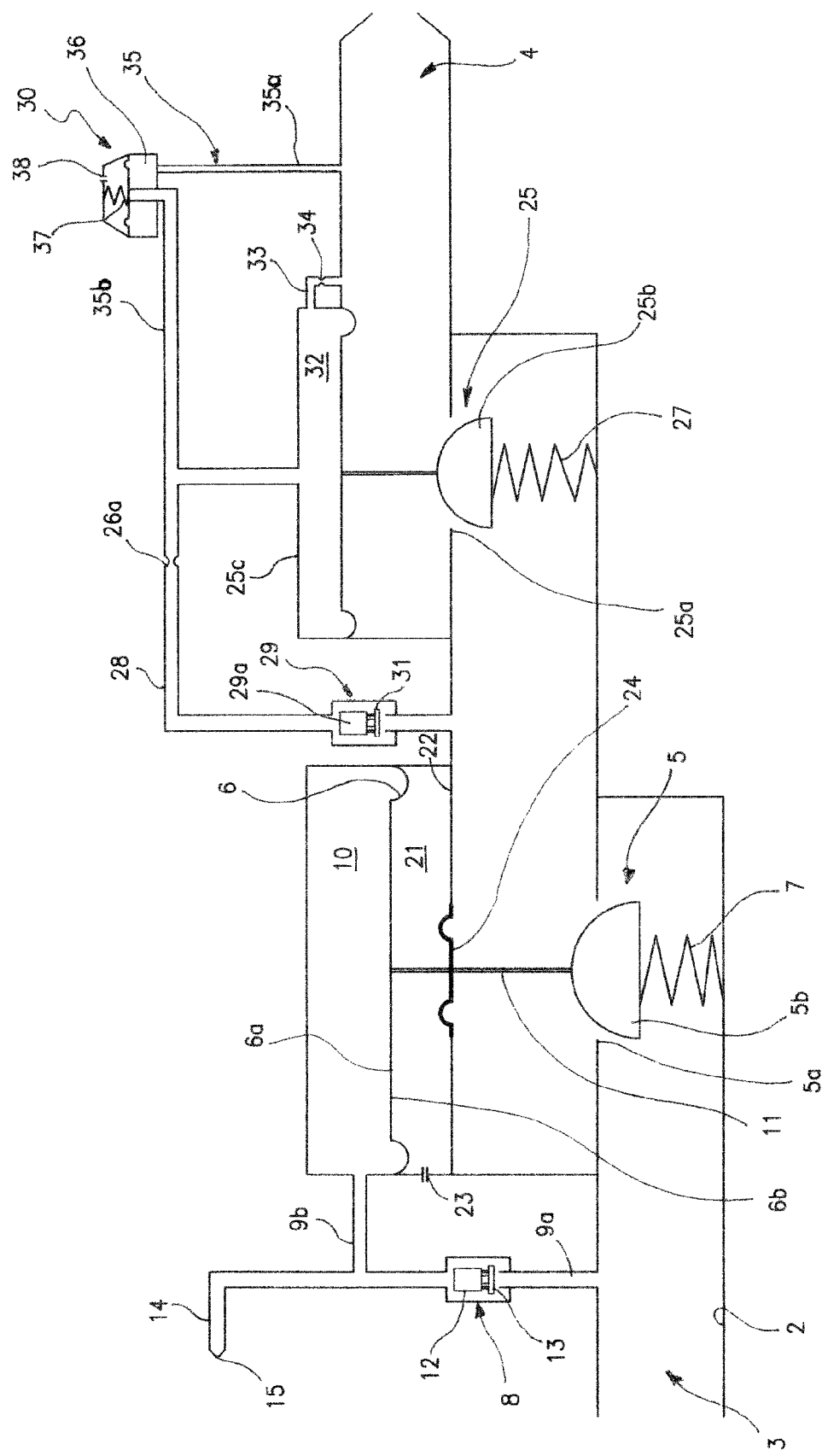
FIG. 3 is a longitudinal section through a variant of the valve unit of FIG. 2.

FIG. 3 shows a variant of the valve unit of FIG. 2 in which details similar to those of the previous embodiment are indicated by the same reference numerals.

This variant differs from that of FIG. 2 mainly in that the duct 28 for tapping off the control pressure for the servo-valve 25 extends between the control chamber 32 and a portion of the main duct 2 disposed between the valve seats 5a and 25a. The solenoid valve 29 for the servo-assistance operation of the servo-valve 25 is provided in this duct 28. In this embodiment, the (pressure) signal for operating the diaphragm servo-valve 25 is tapped off in a position of the duct 2 that is disposed between the valves 5 and 25, in contrast with the previous embodiment (FIG. 2) in which the signal tap was in series with the solenoid valve 8.

The advantage of this embodiment (FIG. 3) is that the opening of the diaphragm servo-valve 25 is dependent on the diaphragm valve 5 being open.

The invention thus achieves the objects proposed, affording the advantages mentioned over known solutions.

The invention claimed is:

1. A device for controlling the delivery of a combustible gas to a burner apparatus, comprising a main gas-delivery duct (2) in which there is at least one servo-assisted diaphragm valve (5) including a valve seat (5a) associated with a corresponding closure member (5b) with diaphragm control (6) for opening the seat against the action of a resilient biasing member (7), the diaphragm valve (5) comprising a respective control solenoid valve (8) with an electromagnetic operator for controlling the opening/closure of the corresponding valve (5), the solenoid valve being arranged to bring about the opening/closure of a duct (9) of a respective servo-assisted control circuit so as to operate the closure member (5b) of the valve (5) indirectly, by the diaphragm control, the duct of the control circuit putting a portion of the main duct (2) that is disposed upstream of the valve seat (5a) with respect to a direction of the gas-flow into flow communication with a respective control chamber (10) of the diaphragm valve, a first side (6a) of the diaphragm (6) of the diaphragm control being subjected to the pressure existing in the respective control chamber (10), the second, opposite side (6b) of the diaphragm (6) delimits a space (21) which is separated from the portion of the main duct (2) that extends downstream of the valve seat so that the second side (6b) of the diaphragm is not subjected to the delivery pressure of the gas that is present in the duct portion, downstream of the valve seat (5a);

wherein a second diaphragm (24) and the closure member (5b) have respective facing sides which have respective surface extensions that are substantially equivalent to one another so as to render the resultant of stresses generated in the device by the pressures acting on the facing sides of the closure member and of the second diaphragm generally such as to have no effect or even to be zero.

2. A device according to claim 1, wherein the space delimited by the second, opposite side (6b) of the diaphragm defines a second chamber (21) which is open to the exterior so that the second side (6b) of the diaphragm is subjected to atmospheric pressure.

3. A device according to claim 2, wherein the second chamber (21) comprises, on a side remote from the diaphragm (6), a wall (22) through which a rod (11) extends for the control of the closure member (5b), the rod (11) having a first end fixed firmly to the closure member and a second, opposite end that can contact the control diaphragm (6).

4. A device according to claim 3, wherein the second, flexible diaphragm (24), fixed firmly to the rod (11), is mounted on the wall (22) so as to permit an axial movement of the rod during the operative travel of the closure member (5b) for the opening/closure of the seat (5a).

5. A device according to Claim 1, wherein the facing sides of the closure member (5b) and of the second diaphragm (24), respectively, are subjected to the delivery pressure of the gas through the device.

6. A device according to claim 4, wherein the rod (11) for operating the closure member (5b) extends through the second diaphragm (24).

7. A device according to claim 1, wherein the biasing member comprises a spring (7) acting directly on the closure member (5b) in order to urge it towards the shut-off position.

8. A device according to claim 1, wherein the portion of the duct (9) of the control circuit that extends between the solenoid valve (8) and the control chamber (10) is connected to a pilot duct (14) for the supply of gas to a respective pilot burner.

9. A device according to claim 1, wherein the first side (6a) of the diaphragm (6) delimiting the control chamber (10) is subjected to the gas-supply pressure gas through the main duct (2).

10. A device according to claim 1, further comprising a delivery-pressure regulator member (20) in the duct (2), downstream of the valve seat (5a).

11. A device according to claim 10 wherein the regulator member (20) comprises a second diaphragm servo-valve (25) arranged in series with the diaphragm valve (5) with respect to the direction of the gas-flow, the second servo-valve (25) including a diaphragm pressure regulator (30).

12. A device according to claim 11 in which the second servo-valve (25) comprises a respective second control solenoid valve (29) with an electromagnetic operator for controlling the opening/closure of the second servo-valve (25), the second solenoid-valve being arranged to act so as to open/close a duct (28) of a respective servo-assisted control circuit (28, 32) so as to operate the closure member (25b) of the servo-valve (25) indirectly by the diaphragm control.

13. A device according to claim 12, wherein both of the ducts (9, 28) for tapping off the control pressures of the respective control circuits, which ducts can tap off a pressure signal for transfer to the corresponding control chambers (10, 32), are connected to and in flow communication with the main duct (2) upstream of the first valve (5).

14. A device according to claim 12, wherein a control-pressure tapping duct (28), of the corresponding control circuit, which duct can tap off the pressure signal for transfer to the respective control chamber (32), is connected to and in flow communication with a portion of the main duct that is disposed between the valve seats (5a, 25a) of the respective valves (5, 25).

15. A device according to claim 11, wherein the diaphragm pressure regulator (30) is disposed in a portion (35) of duct of the control circuit of the second servo-valve (25) which extends between the corresponding control chamber (32) of the second servo-valve (25) and a portion of the main duct (2) downstream of the second servo-valve (25).

* * * * *